(12) United States Patent
Lecler (10) Patent No.: US 9,361,230 B2
(45) Date of Patent: Jun. 7, 2016

(54) THREE CHANNEL CACHE-COHERENCY SOCKET PROTOCOL

(71) Applicant: QUALCOMM Technologies Inc., San Diego, CA (US)

(72) Inventor: Jean-Jacques Lecler, Antibes (FR)

(73) Assignee: Qualcomm Technologies, Inc., San Diego, CA (US)

( * ) Notice: Subject to any disclaimer, the term of this patent is extended or adjusted under 35 U.S.C. 154(b) by 0 days.

(21) Appl. No.: 14/859,340

(22) Filed: Sep. 20, 2015

(65) Prior Publication Data

US 2016/0011976 A1    Jan. 14, 2016

Related U.S. Application Data

(63) Continuation of application No. 13/659,781, filed on Oct. 24, 2012, now Pat. No. 9,280,468.

(60) Provisional application No. 61/551,917, filed on Oct. 26, 2011.

(51) Int. Cl.
     *G06F 12/08*      (2006.01)
     *G06F 13/42*      (2006.01)
     *G06F 3/06*      (2006.01)

(52) U.S. Cl.
     CPC ........ *G06F 12/0815* (2013.01); *G06F 12/0831* (2013.01); *G06F 13/4282* (2013.01); *G06F 2212/622* (2013.01)

(58) Field of Classification Search
None
See application file for complete search history.

(56) References Cited

U.S. PATENT DOCUMENTS

| | | |
|---|---|---|
| 6,341,336 B1 | 1/2002 | Arimilli et al. |
| 6,829,683 B1 | 12/2004 | Kuskin |
| 7,366,847 B2 | 4/2008 | Kruckemyer et al. |
| 7,543,115 B1 | 6/2009 | Batson et al. |
| 2004/0179036 A1 | 9/2004 | Teplov et al. |

(Continued)

FOREIGN PATENT DOCUMENTS

| | | |
|---|---|---|
| EP | 0911736 A1 | 4/1999 |
| JP | H09311820 A | 12/1997 |

(Continued)

OTHER PUBLICATIONS

Open Core Protocol Specification, http://www.accellera.org/downloads/standards/ocp/; OCP Working Group, Accellera.org.*

(Continued)

*Primary Examiner* — Scott Sun
(74) *Attorney, Agent, or Firm* — Muncy, Geissler, Olds & Lowe, P.C.

(57) ABSTRACT

A system and method are disclosed for communicating coherency information between initiator and target agents on semiconductor chips. Sufficient information communication to support full coherency is performed through a socket interface using only three channels. Transaction requests are issued on one channel with responses given on a second. Intervention requests are issued on the same channel as transaction responses. Intervention responses are given on a third channel. Such an approach drastically reduces the complexity of cache coherent socket interfaces compared to conventional approaches. The net effect is faster logic, smaller silicon area, improved architecture performance, and a reduced probability of bugs by the designers of coherent initiators and targets.

30 Claims, 6 Drawing Sheets

(56) References Cited

U.S. PATENT DOCUMENTS

| | | | |
|---|---|---|---|
| 2005/0240734 A1 | 10/2005 | Batson et al. | |
| 2007/0055828 A1 | 3/2007 | Tsien | |
| 2008/0320254 A1 | 12/2008 | Wingard et al. | |
| 2009/0157981 A1* | 6/2009 | Kinter | G06F 9/30047 711/141 |
| 2009/0198913 A1 | 8/2009 | Batson et al. | |
| 2009/0271556 A1* | 10/2009 | Rutherford, III | G06F 13/4022 710/313 |
| 2013/0111148 A1 | 5/2013 | Lecler | |

FOREIGN PATENT DOCUMENTS

| | | | |
|---|---|---|---|
| JP | 2000250883 A | 9/2000 |
| JP | 2001147858 A | 5/2001 |
| JP | 2009301552 A | 12/2009 |

OTHER PUBLICATIONS

Aisopos K., "Extending Open Core Protocol to Support System-Level Cache Coherence, CODES+ISSS '08 Proceedings of the 6th IEEE/ACM/IFIP international conference on Hardware/Software codesign and system synthesis", U.S., ACM, Oct. 19, 2008, pp. 167-172.

International Search Report—PCT/US2012/061923—ISA/EPO—Mar. 22, 2013.

Supplementary European Search Report—EP12843752—Search Authority—The Hague—Jun. 5, 2015.

Written Opinion—PCT/US2012/61923—ISA/EPO—Mar. 22, 2013.

Supplementary European Search Report—EP12843752—Search Authority—The Hague—Sep. 28, 2015.

* cited by examiner

THREE CHANNEL CACHE-COHERENCY SOCKET PROTOCOL

CROSS-REFERENCE TO RELATED APPLICATIONS

This application is a continuation under 35 U.S.C. §120 based on U.S. patent application Ser. No. 13/659,781 filed on Oct. 24, 2012, entitled "THREE CHANNEL CACHE-COHERENCY SOCKET PROTOCOL," which claims the benefit under 35 U.S.C. §119 from U.S. Provisional Patent Application Ser. No. 61/551,917 filed on Oct. 26, 2011, entitled "A THREE-CHANNEL CACHE-COHERENCY SOCKET PROTOCOL" by inventor Jean-Jacques Lecler, which are each assigned to the assignee hereof and the contents of which are each hereby expressly incorporated herein by reference in their entirety.

FIELD OF THE INVENTION

This disclosure is related generally to the field of semiconductor technology and more specifically to systems on chip with cache coherent agents.

BACKGROUND

In a memory-mapped system initiators such as CPUs, GPUs, or other agents operate by reading and writing bytes of data in a target memory. Some agents are highly penalized by the latency to actually get access to their data. A usual approach is then for them to use a local-transient copy of a subset of the data, named a cache. As soon as a cache is present in a system, the system must ensure that no data is written in the memory target while some henceforth obsolete data still resides in that cache. The mechanism to ensure this property is called cache-coherency.

In a system where the various logic components may be designed by different teams, potentially in different companies, it is important to formalize the way cache-coherency information is exchanged. On a system on chip, the following protocols include Cache-Coherency: Open Core Protocol (OCP) 3.0, promoted by OCP International Partnership, and Advanced Microcontroller Bus Architecture (AMBA) Advanced eXtensible Interface (AXI) Coherency Extensions (ACE), promoted by ARM. Between integrated circuits, other protocols have been proposed: FSB (Front Side Bus, promoted by Intel), QPI (Intel Quick Path, promoted by Intel), and HyperTransport (promoted by the HyperTransport Consortium).

Protocols in general and Cache-Coherency protocols in particular have direct or indirect consequences on the logic blocks implementing them. Among other aspects are:
1) the amount of logic gates required to fulfill the protocol requirements;
2) the complexity of this logic, impeding the maximum reachable frequency;
3) the ability to cope with delays induced by the spreading of the various agents across the silicon die;
4) the architectural performance of the system; and
5) the risk of design bugs.

SUMMARY

The present invention is a simplified approach to implementing coherency. It implements a fully cache coherent socket interface using just three channels. It reduces the amount of logic required. The logic is simpler and therefore can run faster. The invention is scalable for large and physically complex systems. It eliminates complex dependencies and thereby improves architectural performance. The invention also is simpler and thereby reduces the risk of design bugs. Overall, the disclosed invention is a coherency protocol that is better suited to modern network-on-chip implementations of connectivity within systems-on-chip.

DETAILED DESCRIPTION

Figure 1:
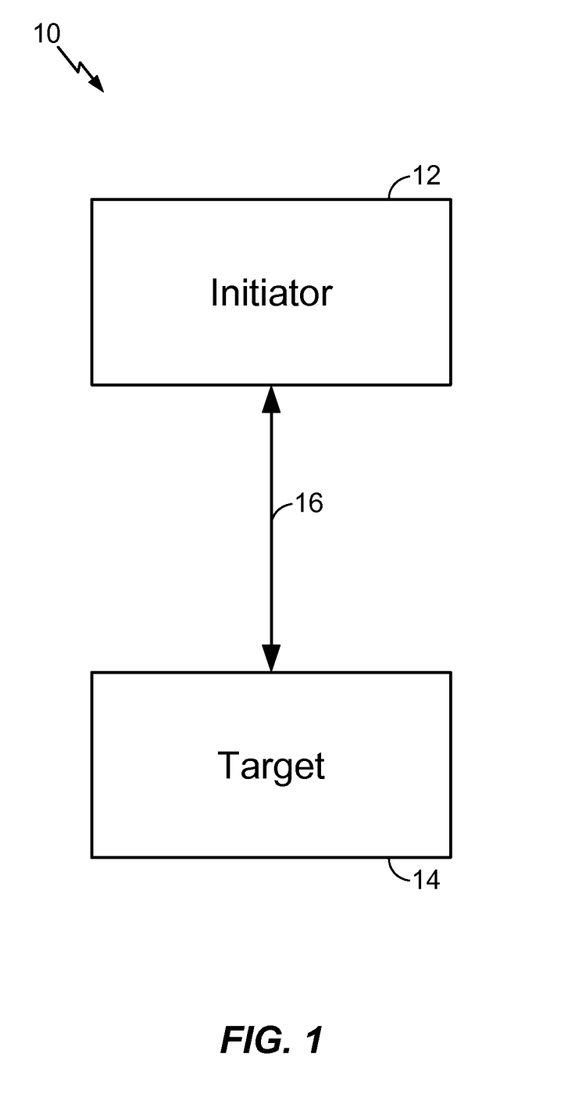
FIG. 1 illustrates a system with communication between an initiator and a target through a socket, in accordance with the teachings of the present invention.

Referring now to FIG. 1, a system 10 is shown with an initiator 12 connected to a target 14 through a socket 16 to convey cache-coherency information. Information is conveyed between the initiator 12 and the target 14 through channels. A channel is a unidirectional interface for information transfer in which the sender may send information to the receiver and the receiver is able to stall the sender from sending information.

The socket 16 comprises several channels, some for which the initiator 12 acts as the sender and the target 14 as the receiver, and some for which the target 14 acts as the sender and the initiator 12 as the receiver. A usual implementation of a channel comprises:
a Data signal from the sender to the receiver, the signal carrying a word of information;
a Valid signal from the sender to the receiver, signifying the desire of the sender to convey a word of information; and
a Ready signal from the receiver to the sender, signifying the willingness of the receiver to accept the word of information.

Both the sender and the receiver agree that a word of information is transferred when both Valid and Ready signals are asserted. Other implementations channels are possible such as implementations in which the receiver indicates to the sender, through credits, an ability to accept information or implementations in which multiple channels are multiplexed on the same physical wires.

In accordance with one aspect of the present invention, the protocol uses 3 channels. The AXI protocol with ACE extensions uses eight channels (named AR, R, AW, W, B, AC, CR, and CD) and two degenerate channels (RACK, WACK) where the receiver must unconditionally accept the information provided by the sender. The OCP 3.0 protocol uses four channels.

Figure 2:
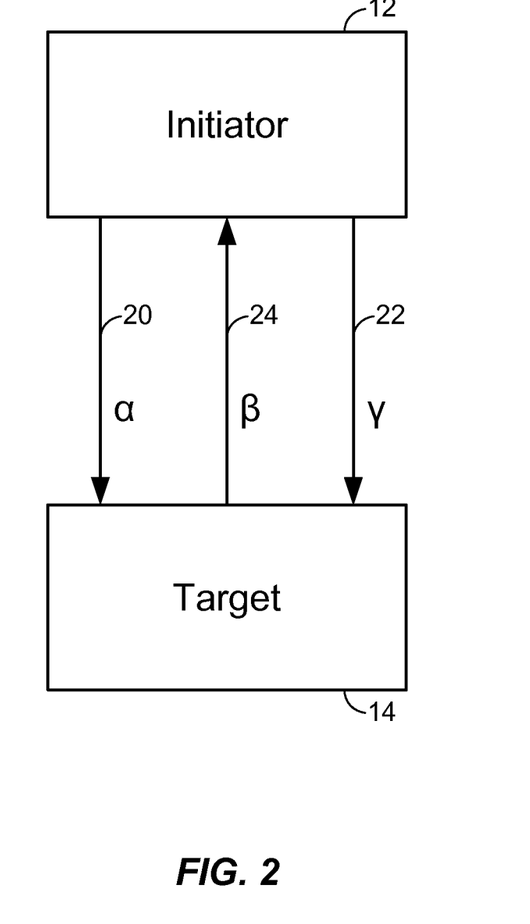
FIG. 2 illustrates the system of FIG. 1 with three channels, in accordance with the teachings of the present invention.

Referring now to FIG. 2, the disclosed protocol includes three channels. Two channels 20 and 22, named alpha (α) and gamma (γ), are oriented to transfer information from the initiator 12 to the target 14. One channel 24, named beta (β), is oriented to transfer information from the target 14 to the initiator 12. Information passed through the channels is usually framed in packets, the process of which is known as packetization. Packets consist of one or more words of information.

As in many protocols, the initiator 12 or the target 14 may demand its counter-part to execute some operation, and the counter-part later acknowledges that the operation has actually been executed. Such an exchange is known as a transaction. A transaction consists in a request packet flowing one direction, and a response packet flowing in the other direction. A protocol in which traffic solely consists of transactions offers interesting properties. For example, it is always possible to determine at low-cost if anything is "in flight," by counting the difference between the number of request packets and the number of response packets seen since the beginning of the world.

Figure 3:
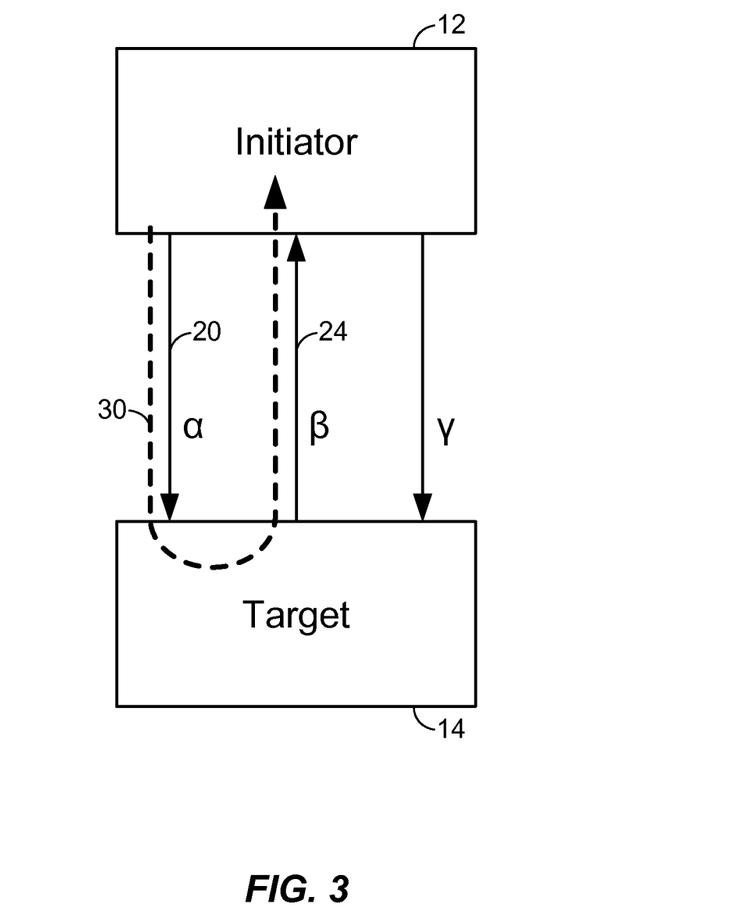
FIG. 3 illustrates a command transaction in which a request is sent by the initiator to the target and a response is subsequently sent by the target to the initiator, in accordance with the teachings of the present invention.

Referring now to FIG. 3, a transaction 30, called a command, includes a request packet sent through channel α 20 from initiator to target, and a response packet sent through channel β 24 from target to initiator. Transactions wherein the request goes from the initiator 12 to the target 14 (and hence the response from the target 14 to the initiator 12) are called commands.

Figure 4:
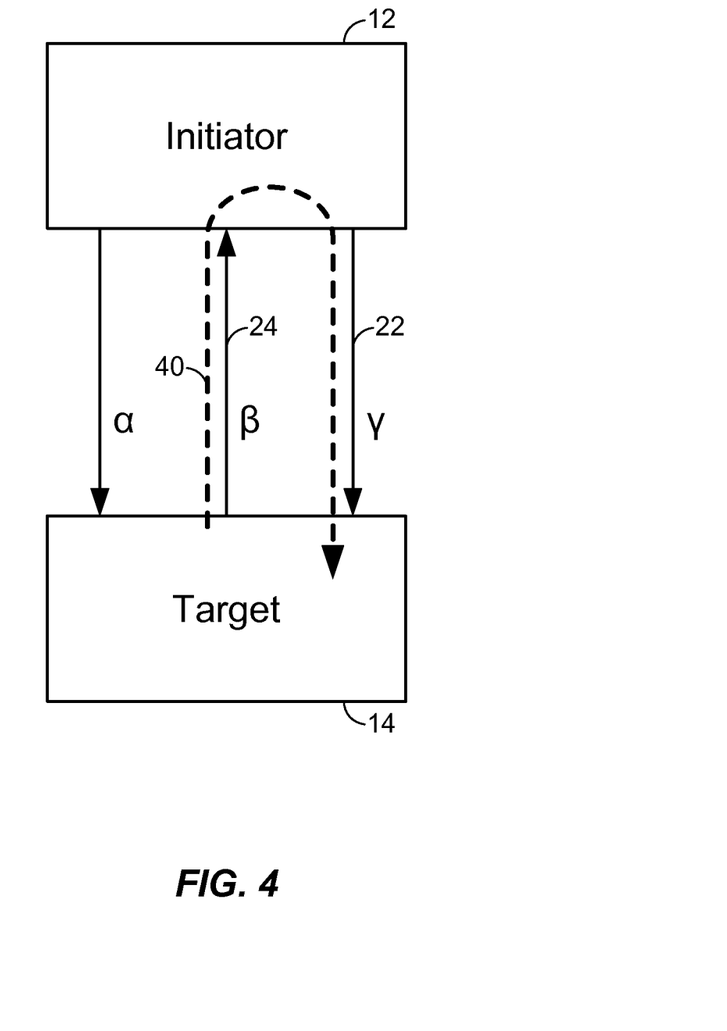
FIG. 4 illustrates an intervention transaction in which a request is sent by the target to the initiator and a response is subsequently sent by the initiator to the target, in accordance with the teachings of the present invention.

Referring now to FIG. 4, a transaction 40, called an intervention, is shown. The request flows from the target 14 to the initiator 12 through channel β 24. The response flows from the initiator 12 to the target 14 through channel γ 22.

Figure 5:
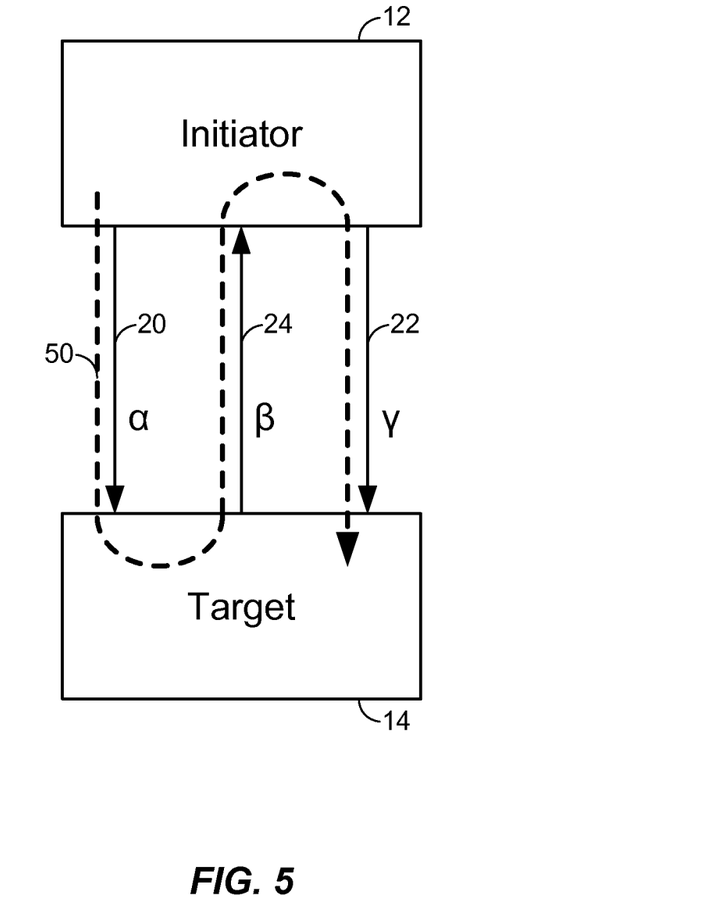
FIG. 5 illustrates a self-intervention, including a command and an intervention wherein the response of the command and the request of the intervention are carried by the same packet, in accordance with the teachings of the present invention.

Referring now to FIG. 5, a transaction 50 is shown. First, a command request from initiator 12 to target 14 is sent through channel α 20. Next, in accordance with one aspect of the present invention, a packet is sent from the target 14 to the initiator 12 on the channel β 24. The packet comprises at the same time a command response and an intervention request. Finally, an intervention response packet is sent from initiator 12 to target 14 on channel γ 22. Such a coupled command and intervention is called a self-intervention.

In a Cache-Coherent system, the address space is usually divided at a given granularity called a line. The line size is usually a power of 2 successive bytes of the address space. Whereas socket interfaces in general might require support for transaction splitting, transaction ordering, and partial response ordering, none of these are essential to the implementation of systems with caches as initiators. An optimized socket interface, according to the present invention, has simplified logic by virtue of a lack of support for requirements of non-coherent transactions. Embodiments of the invention avoid support of one or more of splitting logic, ordering logic, and partial response ordering logic.

In accordance with the teachings of the present invention, using a smaller number (just three) of channels has several benefits and advantages over existing standard protocols. Since every channel has an independent flow control, a certain amount of logic and data-buffering must be provided for each channel. This cost is minimized by having fewer channels. Furthermore, packets in a given channel are naturally ordered, whereas packets between channels are susceptible to having logic race conditions. Preventing such race conditions requires greater complexity in higher layer protocols. This is avoided by the ordering ensured by a shared command response and intervention request channel.

For example, in most cache-coherency protocols the initiator may gain ownership of a line and the target may request that the initiator release this ownership. On ACE, the ownership is transferred through the "R" channel, and released through the "AC" channel. This necessitates a particular rule in the protocol, restricting targets from requesting the release of a line until the target is certain that ownership of the line has reached the initiator; hence the existence of the "RACK" pseudo-channel. As a consequence, an ACE target has to maintain contexts of ownership currently being given to the initiator and refrain from requesting corresponding releases. To operate at full throughput, this table must be able to contain a number of contexts proportional to the round-trip time from the target to the initiator (through R) and back to the target (through RACK). In certain circumstances it may be desirable to introduce a clock domain crossing between the initiator and the target, lengthening this round-trip. Any intervention request on the "AC" channel must first lookup this context table. In some implementations, this necessary lookup may cost a full additional delay cycle.

According to the OCP 3.0 protocol, ownership is transferred through the command response channel and released through a different intervention request channel. In order to avoid the race, OCP uses self-interventions, where any command emitted by an initiator is actually looped back to itself through the target. Thereby the initiator is able to detect the relative ordering of interventions coming from the rest of the system and its own self-interventions. According to the present invention, the traffic overhead created by OCP 3.0 self-interventions is avoided.

In OCP 3.0, every command generates a self-intervention for ordering purposes. In the present invention, the relative ordering of command responses and intervention requests make most self-interventions unnecessary. However some self-intervention, as shown on FIG. 5, have interesting properties. For instance, on ACE, an initiator may yield back locally modified (usually called "dirty") data to the target through two different mechanisms, depending whether the transfer is initiated by the initiator or by the target. When initiated by itself, the initiator requests a "WriteBack" command on the AW channel, and later receives a response on the "B" channel. When initiated by the target, the initiator receives an intervention request through the "AC" channel, and responds through the "CR" channel. As the target initiated eviction must exist in a cache coherent system, the present invention reuses this necessary mechanism for initiator initiated evictions. The self-intervention makes this simple: the initiator sends a command request which demands the target to evict the line from the initiator. The command response from the target is also an intervention request, demanding the eviction of the line.

In order to avoid the possibility of deadlock, many complex rules that require complex, slow, and mistake prone logic are required to be implemented by designers of logic on the target or the initiator side of socket interfaces with many channel protocols. In the present invention, the information flows through α, β, γ, in that order. With the simple rules that the initiator is not allowed to prevent forward progress on β as a result of flow control on α, and that the target is not allowed to prevent forward progress on γ as a result of flow control on β, the risk of transport-level deadlock is avoided. Furthermore the rules are simple enough to be verified by formal property-checkers.

It is also desirable in some systems to cascade cache coherent agents. This could be useful to, for example, interconnect multiple on-chip switch fabrics. To do so requires an agent that has an initiator socket interface on one side and a target socket interface on the other side. Such an agent might comprise an internal cache. A cascaded cache coherent system is impractical with the complex ordering rules of conventional protocols. For example, to preserve order rules, a snoop hit following a snoop miss must wait until the snoop miss response is returned. This would be time consuming and detrimental to system performance. The present invention makes practical implementations of cascaded cache coherent sockets.

Figure 6:
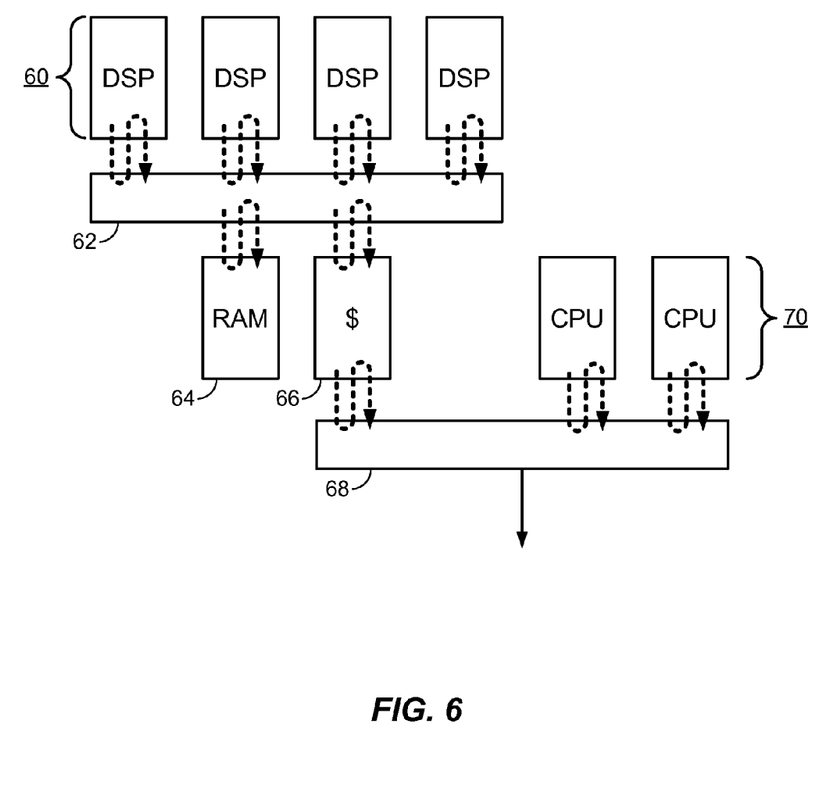
FIG. 6 illustrates a system with four DSPs in accordance with the teachings of the present invention.

Referring now to FIG. 6, a system of four DSP processors 60 are connected to switch fabric 62, which is also connected to RAM 64 and internal cache 66. Internal cache 66 is connected to a second switch fabric 68 which is connected to a system of two CPUs 70 and manages downstream backing store access. Any two connected elements can perform command requests, command responses, intervention requests, and intervention responses using the three channel cache coherency protocol.

In modern systems, the addresses used by the actual initiators are usually not the ones of the physical memory. The addresses used by the initiators are called virtual addresses (VA) and the addresses used by the memory are called physical addresses (PA). In a cache-coherent system, the virtual to physical address translation must occur upstream of the cache hierarchy. This is done by a cache of most recent translations called a Translation Look-aside Buffer (TLB). When the TLB encounters an access whose translation is unknown, it must request for the translation. Computing the actual virtual to physical translation of a given address requires a number of successive accesses in the memory, in a data structure called the "page table." As the piece of logic doing that translation walks through the page table, it is sometimes called a "Walker." The shorter each step, the faster the walker operates, thus the walker tends to be located downstream of the cache hierarchy, close to the memory. As TLBs and the Walker are distant, they have to communicate. The exchange is sometimes called an Address Translation Service (ATS).

ATS comprises exchanges where the TLB requests address translation from the Walker, and other exchanges where the Walker requests the invalidation of some previously established translations. The present invention is able to efficiently transport Address Translation Services, using the commands for translation requests and the interventions for invalidation requests.

In accordance with various aspects of the present invention, at least one of the described components, such as the initiator or the target, is an article of manufacture. Examples of the article of manufacture include: a server, a mainframe computer, a mobile telephone, a personal digital assistant, a personal computer, a laptop, a set-top box, an MP3 player, an email enabled device, a tablet computer, a web enabled device having one or more processors, or ether another special purpose computer (e.g., a Central Processing Unit, a Graphical Processing Unit, or a microprocessor) that is configured to execute an algorithm (e.g., a computer readable program or software) to receive data, transmit data, store data, or perform methods. By way of example, the initiator and/or the target are each a part of a computing device that includes a processor that executes computer readable program code encoded on a non-transitory computer readable medium to perform one or more steps.

It is to be understood that this invention is not limited to particular embodiments or aspects described, as such may vary. It is also to be understood that the terminology used herein is for the purpose of describing particular embodiments only, and is not intended to be limiting, since the scope of the present invention will be limited only by the appended claims.

Where a range of values is provided, such as the number of channels or the number of chips or the number of modules, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An initiator, comprising:
    a socket interface coupled to a socket, wherein the socket comprises a first channel, a second channel, and a third channel; and
    one or more logic components configured to:
        send one or more command requests to a target on the first channel;
        receive one or more command responses and one or more intervention requests from the target on the second channel; and
        send one or more intervention responses to the target on the third channel.

2. The initiator recited in claim 1, wherein the socket interface is further coupled to a second socket through which the target is configured to act as an initiator.

3. The initiator recited in claim 1, wherein the socket interface is further coupled to a second socket through which the initiator is configured to act as a target.

4. The initiator recited in claim 1, wherein at least one of the one or more command requests, the one or more command responses, the one or more intervention requests, or the one or more intervention responses comprise packetized information.

5. The initiator recited in claim 1, wherein the one or more logic components are further configured to ensure forward progress on the second channel independently from forward progress on the first channel.

6. The initiator recited in claim 1, wherein at least one of the one or more command requests, the one or more command responses, the one or more intervention requests, or the one or more intervention responses refer to one or more lines of addressable space.

7. The initiator recited in claim 1, wherein at least one of the one or more command requests, the one or more command responses, the one or more intervention requests, or the one or more intervention responses comprise information related to an address translation service.

8. The initiator recited in claim 1, wherein at least one piece of information received on the second channel is configured to transfer command response information and intervention request information.

9. The initiator recited in claim 1, wherein the one or more logic components are further configured to receive the one or more command responses in an order that is different from an order in which the one or more command requests were sent to the target.

10. The initiator recited in claim 1, wherein the one or more logic components are further configured to send the one or more intervention responses in an order that is different from an order in which the one or more intervention requests were received from the target.

11. A method of communicating information between an initiator and a target, the method comprising:
    sending, from the initiator, one or more command requests to the target on a first channel;
    receiving, at the initiator, one or more command responses and one or more intervention requests from the target on a second channel; and
    sending, from the initiator, one or more intervention responses to the target on a third channel.

12. The method recited in claim 11, further comprising:
    accepting, at the initiator, the one or more command responses and the one or more intervention requests on the second channel without waiting to send the one or more command requests on the first channel or the one or more intervention responses on the third channel.

13. The method recited in claim 11, wherein the initiator sends the one or more intervention responses on the third channel without waiting to send the one or more command requests on the third channel or receive the one or more command responses or the one or more intervention requests on the second channel.

14. The method recited in claim 11, wherein at least one of the one or more command requests, the one or more command responses, the one or more intervention requests, or the one or more intervention responses comprise packetized information.

15. The method recited in claim 14, wherein the packetized information comprises at least one packet that transfers command response information and intervention request information.

16. A target, comprising:
    a socket interface coupled to a socket, wherein the socket comprises a first channel, a second channel, and a third channel; and
    one or more logic components configured to:
        receive one or more command requests from an initiator on the first channel;
        send one or more command responses and one or more intervention requests to the initiator on the second channel; and
        receive one or more intervention responses from the initiator on the third channel.

17. The target recited in claim 16, wherein the socket interface is further coupled to a second socket through which the target is configured to act as an initiator.

18. The target recited in claim 16, wherein the socket interface is further coupled to a second socket through which the initiator is configured to act as a target.

19. The target recited in claim 16, wherein at least one of the one or more command requests, the one or more command responses, the one or more intervention requests, or the one or more intervention responses comprise packetized information.

20. The target recited in claim 16, wherein the one or more logic components are further configured to ensure forward progress on the third channel independently from forward progress on the first channel and the second channel.

21. The target recited in claim 16, wherein at least one of the one or more command requests, the one or more command responses, the one or more intervention requests, or the one or more intervention responses refer to one or more lines of addressable space.

22. The target recited in claim 16, wherein at least one of the one or more command requests, the one or more command responses, the one or more intervention requests, or the one or more intervention responses comprise information related to an address translation service.

23. The target recited in claim 16, wherein at least one piece of information sent on the second channel is configured to transfer command response information and intervention request information.

24. The target recited in claim 16, wherein the one or more logic components are further configured to send the one or more command responses in an order that is different from an order in which the one or more command requests were received from the initiator.

25. The target recited in claim 16, wherein the one or more logic components are further configured to send the one or more intervention requests in an order that is different from an order in which the one or more intervention responses were received from the initiator.

26. A method of communicating information between an initiator and a target, the method comprising:
receiving, at the target, one or more command requests from the initiator on a first channel;
sending, from the target, one or more command responses and one or more intervention requests to the initiator on a second channel; and
receiving, at the target, one or more intervention responses from the initiator on a third channel.

27. The method recited in claim 26, further comprising:
accepting, at the target, the one or more intervention responses on the third channel without waiting to the one or more command requests on the first channel or send the one or more command responses or the one or more intervention requests on the second channel.

28. The method recited in claim 26, wherein the target sends the one or more command responses and the one or more intervention requests on the second channel without waiting to receive the one or more command requests on the first channel.

29. The method recited in claim 26, wherein at least one of the one or more command requests, the one or more command responses, the one or more intervention requests, or the one or more intervention responses comprise packetized information.

30. The method recited in claim 29, wherein the packetized information comprises at least one packet that transfers command response information and intervention request information.

* * * * *